(12) United States Patent
Boday et al.

(10) Patent No.: US 9,005,338 B2
(45) Date of Patent: Apr. 14, 2015

(54) SILICONE-BASED CHEMICAL FILTER AND SILICONE-BASED CHEMICAL BATH FOR REMOVING SULFUR CONTAMINANTS

(71) Applicant: International Business Machines Corporation, Armonk, NY (US)

(72) Inventors: Dylan J. Boday, Tucson, AZ (US); Joseph Kuczynski, Rochester, MN (US); Robert E. Meyer, III, Rochester, MN (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/802,652

(22) Filed: Mar. 13, 2013

(65) Prior Publication Data

US 2013/0263736 A1    Oct. 10, 2013

Related U.S. Application Data

(62) Division of application No. 13/010,995, filed on Jan. 21, 2011.

(51) Int. Cl.
*B01D 53/14*   (2006.01)
*B01D 53/48*   (2006.01)
(Continued)

(52) U.S. Cl.
CPC .......... *B01D 53/1456* (2013.01); *B01D 53/228* (2013.01); *B01D 67/0006* (2013.01);
(Continued)

(58) Field of Classification Search
USPC .................. 210/634, 343, 644, 656, 660, 661; 96/309, 317, 326, 329, 342, 344, 353, 96/FOR. 134, FOR. 145, 351; 95/44, 95/135–137, 149, 159, 181, 226, 235; 261/119.1, 121.1; 52/218; 454/184, 454/187
See application file for complete search history.

(56) References Cited

U.S. PATENT DOCUMENTS 3,686,930 A * 8/1972 Kniebes et al. ............... 73/23.35
3,748,827 A * 7/1973 Bulian et al. ..................... 95/154
(Continued)

FOREIGN PATENT DOCUMENTS

DE         19857697 A1   6/2000
DE      102005056052 A1   5/2007
(Continued)

OTHER PUBLICATIONS

Christopher Muller, Control of Corrosive Gases to Avoid Electrical Equipment Failure, Purafil, webpage: www.purafil.com/literature/control-of-corrosive-gases.pdf, 1999, pp. 1-13.*

(Continued)

*Primary Examiner* — David C Mellon
*Assistant Examiner* — Pranav Patel
(74) *Attorney, Agent, or Firm* — Matthew J. Bussan

(57) ABSTRACT

Sulfur contaminants, such as elemental sulfur ($S_8$), hydrogen sulfide and other sulfur components in fluids (e.g., air, natural gas, and other gases, as well as water and other liquids) are removed using a silicone-based chemical filter/bath. In one embodiment, a silicone-based chemical filter includes a membrane having a cross-linked silicone that is a reaction product of an olefin and a polyhydrosiloxane. For example, sulfur contaminants in air may be removed by passing the air through the membrane before the air enters a data center or other facility housing computer systems. In another embodiment, a silicone-based chemical bath includes a housing having an inlet port, an outlet port, and a chamber containing a silicone oil. For example, sulfur contaminants in air may be removed by passing the air through the silicone oil in the chamber before the air enters a data center or other facility housing computer systems.

2 Claims, 8 Drawing Sheets

(51) Int. Cl.
    *B01D 53/22* (2006.01)
    *B01D 67/00* (2006.01)
    *B01D 71/70* (2006.01)
    *C10G 31/09* (2006.01)
    *B01D 39/16* (2006.01)

(52) U.S. Cl.
    CPC .............. *B01D71/70* (2013.01); *C10G 31/09* (2013.01); *B01D 39/1676* (2013.01); *B01D 2257/304* (2013.01); *B01D 2323/30* (2013.01); *C10G 2300/202* (2013.01); *C10G 2300/104* (2013.01); *C10G 2300/1044* (2013.01); *C10G 2300/1055* (2013.01)

(56) References Cited

U.S. PATENT DOCUMENTS

| | | | |
|---|---|---|---|
| 3,936,976 | A | 2/1976 | Porter et al. |
| 4,115,081 | A * | 9/1978 | Ohno et al. .................. 95/230 |
| 4,425,117 | A | 1/1984 | Hugemann et al. |
| 4,657,843 | A | 4/1987 | Fukuyama et al. |
| 4,670,299 | A | 6/1987 | Fukuyama et al. |
| 4,781,733 | A | 11/1988 | Babcock et al. |
| 4,950,314 | A | 8/1990 | Yamada et al. |
| 4,965,062 | A * | 10/1990 | Van Dijk et al. ............ 423/576.7 |
| 5,147,957 | A | 9/1992 | Kumar |
| 5,233,071 | A | 8/1993 | Wilczek |
| 5,286,280 | A | 2/1994 | Chiou |
| 5,733,663 | A | 3/1998 | Scheunemann et al. |
| 5,777,007 | A | 7/1998 | Kagawa et al. |
| 5,876,739 | A | 3/1999 | Turnblad et al. |
| 5,925,595 | A | 7/1999 | Seitz et al. |
| 6,001,943 | A | 12/1999 | Enami et al. |
| 6,060,530 | A | 5/2000 | Chaouk et al. |
| 6,165,253 | A * | 12/2000 | Sirkar et al. .................. 96/6 |
| 6,339,166 | B1 | 1/2002 | Allcock et al. |
| 6,417,236 | B1 | 7/2002 | Hobson et al. |
| 6,514,439 | B2 | 2/2003 | Van Koppenhagen et al. |
| 6,673,246 | B2 | 1/2004 | Markowitz et al. |
| 6,682,751 | B1 | 1/2004 | Hargrove et al. |
| 6,710,181 | B2 | 3/2004 | Kumagai et al. |
| 6,805,964 | B2 | 10/2004 | Clouser et al. |
| 6,858,634 | B2 | 2/2005 | Asrar et al. |
| 6,900,269 | B2 | 5/2005 | Hwang et al. |
| 6,972,249 | B2 | 12/2005 | Akram et al. |
| 7,056,522 | B2 | 6/2006 | Voris et al. |
| 7,101,394 | B2 | 9/2006 | Hamm et al. |
| 7,169,832 | B2 | 1/2007 | Poppe et al. |
| 7,211,192 | B2 | 5/2007 | Shea et al |
| 7,553,901 | B2 | 6/2009 | Horikoshi et al. |
| 7,585,320 | B2 | 9/2009 | Hamm et al. |
| 7,687,722 | B2 | 3/2010 | Japp et al. |
| 7,759,406 | B2 | 7/2010 | Kumon et al. |
| 7,767,219 | B2 | 8/2010 | Weber et al. |
| 7,767,736 | B2 | 8/2010 | Baran, Jr. |
| 7,814,737 | B2 | 10/2010 | Pierson |
| 7,851,055 | B2 | 12/2010 | Fukushima |
| 2002/0014154 | A1* | 2/2002 | Witzko et al. .................. 95/178 |
| 2002/0119317 | A1 | 8/2002 | Gan et al. |
| 2003/0173255 | A1 | 9/2003 | White et al. |
| 2004/0149127 | A1 | 8/2004 | Lyons et al. |
| 2006/0000766 | A1 | 1/2006 | Ji |
| 2006/0118490 | A1 | 6/2006 | Landry et al. |
| 2007/0023957 | A1 | 2/2007 | Kotov et al. |
| 2007/0164271 | A1 | 7/2007 | Wait, Jr. |
| 2007/0241303 | A1 | 10/2007 | Zhong et al. |
| 2007/0251393 | A1* | 11/2007 | Pope et al. .................. 96/329 |
| 2007/0257091 | A1 | 11/2007 | Kuczynski |
| 2008/0097014 | A1 | 4/2008 | Park et al. |
| 2008/0191729 | A1 | 8/2008 | Blanco et al. |
| 2008/0193543 | A1 | 8/2008 | Morello, III et al. |
| 2008/0210087 | A1 | 9/2008 | Ku et al. |
| 2008/0264563 | A1 | 10/2008 | Kuczynski et al. |
| 2009/0004488 | A1 | 1/2009 | Park et al. |
| 2009/0117373 | A1 | 5/2009 | Wisniewski et al. |
| 2009/0142638 | A1 | 6/2009 | Katayama |
| 2010/0027192 | A1 | 2/2010 | Perry et al. |
| 2010/0030185 | A1 | 2/2010 | Hood et al. |
| 2010/0234481 | A1 | 9/2010 | Sugimoto et al. |
| 2010/0240811 | A1 | 9/2010 | He et al. |
| 2010/0243520 | A1 | 9/2010 | Glover et al. |
| 2011/0092640 | A1 | 4/2011 | Tzou |
| 2011/0097416 | A1 | 4/2011 | Nguyen et al. |
| 2011/0189381 | A1 | 8/2011 | Boday et al. |
| 2012/0187046 | A1 | 7/2012 | Boday et al. |
| 2012/0279768 | A1 | 11/2012 | Boday et al. |
| 2013/0034739 | A1 | 2/2013 | Boday et al. |
| 2013/0109565 | A1 | 5/2013 | Boday et al. |

FOREIGN PATENT DOCUMENTS

| | | | |
|---|---|---|---|
| EP | 0315836 A2 | | 5/1989 |
| JP | 53-42181 | * | 4/1978 |
| JP | 2000-297094 | | 10/2000 |
| WO | 2006/096033 A1 | | 9/2006 |

OTHER PUBLICATIONS

Manuel A. Rivera; Emphasis on Hydrogen Sulphide Related Poblems; Geothermal Training Programme; United Naitions University; 2007; pp. 461-490.*

English language machine translation of abstract of JP53-42181, 1 page.*

U.S. Appl. No. 12/696,328, to Boday et al., entitled "Anti-Corrosion Conformal Coating for Metal Conductors Electrically Connecting an Electronic Circuit", filed Jan. 29, 2010, assigned to International Business Machines Corporation.

Wikipedia contributors, "Natural gas processing", Wikipedia, The Free Encyclopedia, http://en.wikipedia.org/w/index.php?title=Natural_gas_processing&oldid=400027904 (accessed Dec. 13, 2010).

Wikipedia contributors, "Silsesquioxane", Wikipedia, The Free Encyclopedia, http://en.wikipedia.org/w/index.php?title=Silsesquioxane&oldid=402217379 (accessed Dec. 13, 2010).

"UCARSOL GT 10 Antifoam", Product Information, Gas Treating Products & Services, The Dow Chemical Company, Midland, Michigan, Published Jul. 2004. (Available at http://www.dow.com/gastreating/solution/ngp_osr.htm).

King, David L., et al., "Removal of Sulfur Components from Low Sulfur Gasoline Using Copper Exchanged Zeolite Y at Ambient Temperature", Pacific Northwest Laboratory, Richland, Washington, no date. (Available at http://iic.pnl.gov/abstracts/nacs/p_001.pdf).

"Hydrogen Sulfide Removal Methods", Excel Water Technologies, Inc., Fort Lauderdale, Florida, dated 2007. (Available at http://www.excelwater.com/eng/b2c/h2s.php).

I. Manconi et al., "Removal of H2S and Voltatile Organic Sulfur Compounds by Silicone Membrane Extraction", Research Article, Society of Chemical Industry, Aug. 4, 2008, pp. 69-77.

U.S. Appl. No. 13/010,995, to Boday et al., entitled "Silicone-Based Chemical Filter and Silicone-Based Chemical Bath for Removing Sulfur Contaminants", filed Jan. 21, 2011, assigned to International Business Machines Corporation.

Guoliang Zhang, E.L. Cussler, "Hollow fibers as structured distillation packing", Journal of Membrane Science, vol. 215, Issues 1-2, Apr. 15, 2003, pp. 185-193.

J. Andrieu, "Influence of Wettability on Liquid Phase Texture in a Countercurrently Irrigated Packing", Chemical Engineering Science, vol. 30, 1975, pp. 217-220.

Ezdine Ferjani et al., "Bulk and surface modification of cellulose diacetate based RO/NF membranes by polymethylhydrosiloxane—Preparation and characterization", Desalination, vol. 146, Issues 1-3, 2002, pp. 325-330.

Ronald L. Cicero et al., "Photoreactivity of Unsaturated Compounds with Hydrogen-Terminated Silicon (111)", Langmuir, vol. 16, Issue 13, 2000, pp. 5688-5695.

John H. MacMillan, Ph.D., "Homogeneous Platinum Catalysts", United Chemical Technologies, Inc., 2008, 69 pages.

(56) References Cited

OTHER PUBLICATIONS

Rosaria Ciriminna, et al., "Closing the Organosilicon Synthetic Cycle: Efficient Heterogeneous Hydrosilylation of Alkenes over SiliaCat Pt(0)", ACS Sustainable Chemistry & Engineering, 2012, 5 pages.
U.S. Appl. No. 14/244,921, to Boday et al., entitled "Microcapsules Adapted to Rupture in a Magnetic Field", filed Apr. 4, 2014, assigned to International Business Machines Corporation.
U.S. Appl. No. 14/244,964, to Boday et al., entitled "Microcapsules Adapted to Rupture in a magnetic Field", filed Apr. 4, 2014, assigned to International Business Machines Corporation.
U.S. Appl. No. 14/245,074, to Boday et al., entitled "Microcapsules Adapted to Rupture in a Magnetic Field", Apr. 4, 2014, assigned to International Business Machines Corporation.
Barry S. Hindin, "Silver Sulfide Corrosion Control Using Corrosion Prevention Compounds", Corrosion 2006, Mar. 12-16, 2006, San Diego, California, Paper No. 06264, Copyright 2006, NACE International.
English translation of DE 19857697 A1, Jun. 15, 2000.
U.S. Appl. No. 13/802,543, to Boday et al., entitled "Silicone-Based Chemical Filter and Silicone-Based Chemical Bath for Removing Sulfur Contaminants", filed Mar. 13, 2013, assigned to International Business Machines Corporation.
Kumar et al., "Instantaneous, Facile and Selective Synthesis of Tetrabromobisphenol A using Potassium Tribromide: An Efficient and Renewable Brominating Agent", Organic Process Research & Development, vol. 14, No. 1, 2010, pp. 174-179, Published on Web Dec. 20, 2009.
U.S. Appl. No. 13/102,306, to Boday et al., entitled "Flame Retardant Filler", filed May 6, 2011, assigned to International Business Machines Corporation.
B. J. Blaiszik et al., "Microcapsules filled with reactive solutions for self-healing materials," Polymer, vol. 50, pp. 990-997, 2009.
E. N. Brown et al., "In situ poly(urea-formaldehyde) microencapsulation of dicyclopentadiene," Journal of Microencapsulation, vol. 20, No. 6, pp. 719-730, 2003.
Shang-Hsiu Hu et al., "Controlled Rupture of Magnetic Polyelectrolyte Microcapsules for Drug Delivery," Langmuir, vol. 24, No. 20, pp. 11811-11818, 2008.
M. Yamaura et al., "Preparation and characterization of (3-aminopropyl) triethoxysilane-coated magnetite nanoparticles," Journal of Magnetism and Magnetic Materials, vol. 279, pp. 210-217, 2004.
U.S. Appl. No. 13/204,009, to Boday et al., entitled "Microcapsules Adapted to Rupture in a Magnetic Field to Enable Easy Removal of One Substrate From Another for Enhanced Reworkability", filed Aug. 5, 2011, assigned to International Business Machines Corporation.
S. F. Peteu et al., "Responsive Polymers for Crop Protection," Polymers, vol. 2, pp. 229-251, Aug. 19, 2010.
J. Liu et al., "Magnetically Sensitive Alginate-Templated Polyelectrolyte Multilayer Microcapsules for Controlled Release of Doxorubicin," Journal of Physical Chemistry C, vol. 114, No. 17, pp. 7673-7679, Apr. 14, 2010.
M. Alley et al., "Pop-up and/or Starter Fertilizers for Corn," Virginia Cooperative Extension Publication 3002-1438, pp. 1-5, 2010.
U.S. Appl. No. 13/283,734, to Boday et al., entitled "Microcapsules Adapted to Rupture in a Magnetic Field", filed Oct. 28, 2011, assigned to International Business Machines Corporation.
"Flame Retardant Fact Sheet; Other Phosphorous Flame Retardants", European Flame Retardants Association, Sep. 28, 2011, 2 pages. (http://www.cefic-efra.com/images/stories/factsheet/7OtherPhosphorusFactSheetAB-1_00.pdf).
English Language Translation of Claims in CN101033327, 2 pages.
U.S. Appl. No. 13/397,010, to Boday et al., entitled "Non-Halogenated Flame Retardant Filler", filed Feb. 15, 2012, assigned to International Business Machines Corporation.
Dean et al., "Characterization of a Thermal Interface Material for Burn-in Application", 2000, 6 pages. <https://www51.honeywell.com/sm/em/common/documents/4.2_technical_papers_2000_4.pdf>.
"Development of Heat-dissipating Sheets achieving both Metal-like High Thermal Conductivity and Flexibility", News Release, Hitachi Chemical Co., Ltd., Japan, Jun. 23, 2009, 3 pages. <http://www.hitachi-chem.co.jp/english/information/2009/n_090623.html>.
"Hi-Flow 225FT; Reworkable, Pressure Sensitive Phase Change Material", Product Brochure, The Bergquist Company, Chanhassen, Minnesota, 2008, 1 page. <http://www.bergquistcompany.com/pdfs/dataSheets/PDS_HF_225FT_12.08_E.pdf>.
U.S. Appl. No. 13/495,132, to Boday et al., entitled "Thermal Interface Material (TIM) With Thermally Conductive Integrated Release Layer", filed Jun. 13, 2012, assigned to International Business Machines Corporation.
U.S. Appl. No. 14/512,491, to Boday et al., entitled "Flame Retardant Filler", filed Oct. 13, 2014, assigned to International Business Machines Corporation.

* cited by examiner

SILICONE-BASED CHEMICAL FILTER AND SILICONE-BASED CHEMICAL BATH FOR REMOVING SULFUR CONTAMINANTS

CROSS-REFERENCE TO RELATED APPLICATION

This patent application is a divisional application of pending U.S. patent application Ser. No. 13/010,995, filed Jan. 21, 2011, entitled "SILICONE-BASED CHEMICAL FILTER AND SILICONE-BASED CHEMICAL BATH FOR REMOVING SULFUR CONTAMINANTS", which is hereby incorporated herein by reference in its entirety.

BACKGROUND OF THE INVENTION

1. Field of Invention

The present invention relates in general to the field of contaminant removal. More particularly, the present invention relates to removing sulfur contaminants, especially sulfur-bearing gases such as elemental sulfur ($S_8$), hydrogen sulfide, and other sulfur components, in fluids (e.g., air, natural gas, refinery gas, and other gases; as well as water, natural gas liquids (NGLs), diesel fuel, gasoline, and other liquids) using a silicone-based chemical filter or a silicone-based chemical bath.

2. Background Art

Acid-bearing gases in air (e.g., the air within a data center) can lead to a greater incidence of corrosion-induced hardware failures in computer systems and other electronic devices. This problem is especially prone to occur in industrialized countries. Sulfur components (e.g., elemental sulfur, hydrogen sulfide, and/or sulfur oxides) in the air are particularly troublesome gases. It has been demonstrated that the most aggressive of these sulfur-bearing gases is elemental sulfur ($S_8$).

Corrosion of metal conductors caused by sulfur components in the air is especially severe when one or more of the metal conductors is/are a silver-containing metal. Such silver-containing metal conductors are frequently used in electronic devices to electrically connect electronic components. Examples include the silver layer of gate resistors, described below, and many lead-free solders (e.g., Sn—Ag—Cu solder).

A data center is a facility used to house numerous computer systems and various associated systems, such as data storage systems and telecommunications systems. Data centers typically include redundant/backup power supplies, redundant data communications connections, environmental controls (e.g., HVAC, fire suppression, and the like) and security systems. Data centers are also known as "server farms" due to the large number of computer systems (e.g., servers) typically housed within these facilities.

Typically, the environment of a data center is not monitored for the specific nature of gaseous components. This leaves three options: 1) assume that the data center is relatively clean (i.e., the data center environment is MFG Class I or MFG Class II); 2) harden the electronic components of the computer systems and the various associated systems housed in the data center; or 3) filter or scrub the incoming air to the data center. The first option (option 1) leaves at risk the computer systems and the various associated systems housed within the data center. The second option (option 2) drives additional cost (via the purchase of hardened components or use of conformal coatings which provide some level of protection). The third option (option 3) is problematic using current filtering and scrubbing techniques because removing sulfur-bearing gasses in air while letting the remaining gasses pass is very difficult.

With regard to hardening solutions, it is known to cover metal conductors with a conformal coating to protect the metal conductors from corrosion. For example, U.S. Pat. No. 6,972,249 B2, entitled "Use of Nitrides for Flip-Chip Encapsulation", issued Dec. 6, 2005 to Akram et al., discloses a semiconductor flip-chip that is sealed with a silicon nitride layer on an active surface of the flip-chip. U.S. patent application Ser. No. 12/696,328, entitled "Anti-Corrosion Conformal Coating for Metal Conductors Electrically Connecting an Electronic Component", filed Jan. 29, 2010 by Boday et al., discloses a conformal coating that comprises a polymer into which a phosphine compound is impregnated and/or covalently bonded. The phosphine compound in the polymer reacts with any corrosion inducing sulfur component in the air and prevents the sulfur component from reacting with the underlying metal conductors. However, as mentioned above, a key disadvantage with such hardening solutions is cost.

With regard to filtering and scrubbing solutions, it is known to remove sulfur-bearing gasses in air using polymer membranes that incorporate functional groups such as amines or phosphines. However, the concentration of the functional group in the polymer membrane is commonly very low (typically, less than 0.1 mole percent) and the functional group will quickly saturate, thus limiting the amount of unwanted gas that can be removed. As the concentration of the functional group in the polymer membrane is increased, the integrity of the membrane suffers greatly. Similarly, polymers that contain a sulfur chelating molecule can no longer absorb sulfur-bearing gases once the sulfur chelating molecule chelates.

As mentioned above, the problem of corrosion caused by sulfur components (e.g., elemental sulfur, hydrogen sulfide, and/or sulfur oxides) in the air is especially severe when one or more of the metal conductors that electrically connect an electronic component is/are a silver-containing metal. For example, each of the gate resistors of a resistor network array typically utilizes a silver layer at each of the gate resistor's terminations. Gate resistors are also referred to as "chip resistors" or "silver chip resistors". Typically, gate resistors are coated with a glass overcoat for corrosion protection. Also for corrosion protection, it is known to encapsulate gate resistors in a resistor network array by applying a coating of a conventional room temperature-vulcanizable (RTV) silicone rubber composition over the entire printed circuit board on which the resistor network array is mounted. However, the glass overcoat and conventional RTV silicone rubber compositions fail to prevent or retard sulfur components in the air from reaching the silver layer in gate resistors. Hence, any sulfur components in the air will react with the silver layer in the gate resistor to form silver sulfide. This silver sulfide formation often causes the gate resistor to fail, i.e., the formation of silver sulfide, which is electrically non-conductive, produces an electrical open at one or more of the gate resistor's terminations.

FIG. 1 illustrates, in an exploded view, an example of a conventional gate resistor 100 of a resistor network array. A resistor element 102 is mounted to a substrate 104, such as a ceramic substrate. The gate resistor 100 includes two termination structures 110, each typically comprising an inner Ag (silver) layer 112, a protective Ni (nickel) barrier layer 114, and an outer solder termination layer 116. Typically, for corrosion protection, the gate resistor 100 is coated with a glass overcoat 120. Additionally, for corrosion protection, a coating (not shown) of a conventional RTV silicone rubber composition may encapsulate the gate resistor 100. As noted above, it is known to encapsulate gate resistors in a resistor network array mounted on a printed circuit board by applying a coating of a conventional RTV silicone rubber composition over the entire board. However, as noted above, the glass overcoat 120 and conventional RTV silicone rubber compositions fail to prevent or retard sulfur components in the air from reaching the inner silver layer 112. Hence, any sulfur components in the air will react with the inner silver layer 112 to form silver sulfide 202 (shown in FIG. 2). FIG. 2 illustrates, in a sectional view, the conventional gate resistor 100 shown in FIG. 1, but which has failed due to exposure to sulfur-bearing gases. The silver sulfide formation 202 (often referred to as silver sulfide "whiskers") produces an electrical open at one or more of the gate resistor's terminations 110 because silver sulfide is an electrical non-conductor and, thereby, results in failure of the gate resistor 100.

The use of silver as an electrical conductor for electrically connecting electronic components is increasing because silver has the highest electrical conductivity of all metals, even higher than copper. In addition, the concentration of sulfur components in the air is unfortunately increasing as well. Hence, the problem of corrosion caused by sulfur components in the air is expected to grow with the increased use of silver as an electrical conductor for electrically connecting electronic components and the increased concentration of sulfur components in the air.

The removal of sulfur contaminants in gases and liquids is necessary, or at least desirable, in many industries. For example, acidic sulfur gases must be removed from natural gas in natural gas processing. Refinery gas treatment typically includes sulfur reduction or removal. Sulfur reduction is typically necessary in the production of natural gas liquids (NGLs), diesel fuel and gasoline. Likewise, it is desirable to remove sulfur from well water. Current techniques used in these industries for the removal of sulfur contaminants are costly and inefficient.

Therefore, a need exists for an enhanced mechanism for removing sulfur contaminants, especially sulfur-bearing gases such as elemental sulfur ($S_8$), hydrogen sulfide, and other sulfur components, in fluids (e.g., air, natural gas, refinery gas, and other gases; as well as water, natural gas liquids (NGLs), diesel fuel, gasoline, and other liquids).

SUMMARY OF THE INVENTION

According to the preferred embodiments of the present invention, a silicone-based chemical filter or a silicone-based chemical bath is employed to remove sulfur contaminants, such as elemental sulfur ($S_8$), hydrogen sulfide and other sulfur components, in fluids (e.g., air, natural gas, and other gases; as well as water, natural gas liquids (NGLs), diesel fuel, gasoline, and other liquids). In one embodiment, a silicone-based chemical filter includes a membrane having a cross-linked silicone that is a reaction product of an olefin and a polyhydrosiloxane. In an exemplary application for this embodiment, sulfur contaminants in air are removed by passing the air through the membrane before the air enters a data center or other facility housing computer systems. In another embodiment, a silicone-based chemical bath includes a housing having an inlet port, an outlet port, and a chamber containing a silicone oil. In an exemplary application of this embodiment, sulfur contaminants in air are removed by passing the air through the silicone oil in the chamber before the air enters a data center or other facility housing computer systems.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS

1. Overview

Figure 1:
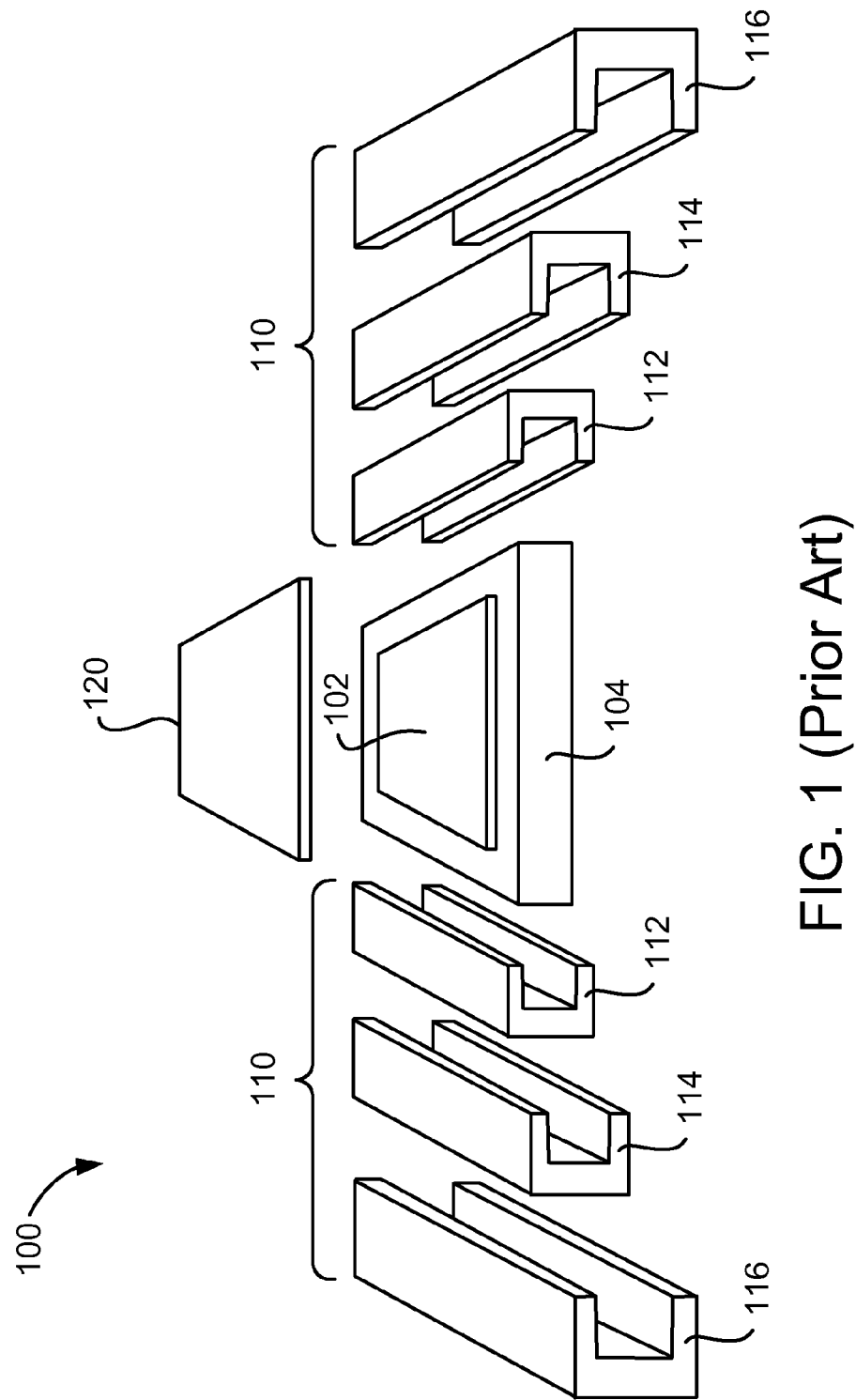
FIG. 1 is an exploded view of a conventional gate resistor of a resistor network array.
Figure 2:
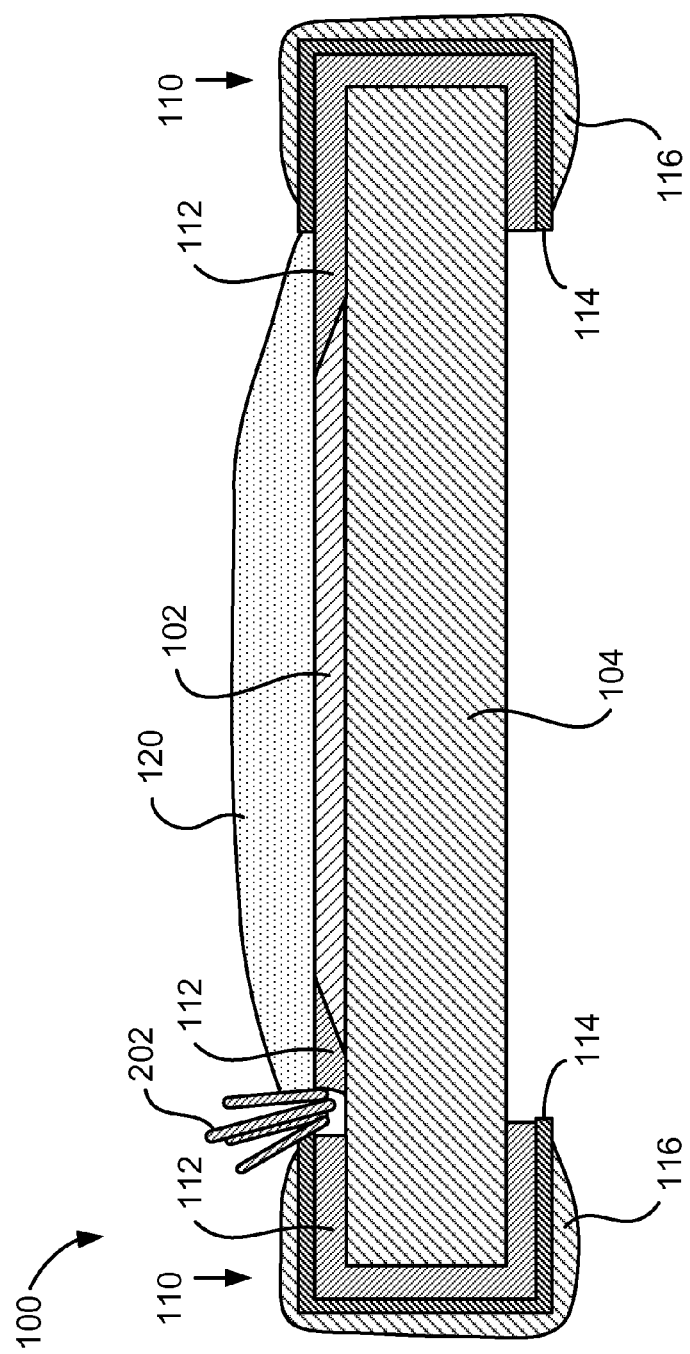
FIG. 2 is a sectional view of the conventional gate resistor shown in FIG. 1, but which has failed due to exposure to sulfur-bearing gases.

According to the preferred embodiments of the present invention, a silicone-based chemical filter or silicone-based chemical bath is employed to remove sulfur contaminants, such as elemental sulfur ($S_8$), hydrogen sulfide and other sulfur components, in fluids (e.g., air, natural gas, and other gases; as well as water, natural gas liquids (NGLs), diesel fuel, gasoline, and other liquids). In one embodiment, a silicone-based chemical filter includes a membrane having a cross-linked silicone that is a reaction product of an olefin and a polyhydrosiloxane. In an exemplary application for this embodiment, sulfur contaminants in air are removed by passing the air through the membrane before the air enters a data center or other facility housing computer systems. In another embodiment, a silicone-based chemical bath includes a housing having an inlet port, an outlet port, and a chamber containing a silicone oil. In an exemplary application of this embodiment, sulfur contaminants in air are removed by passing the air through the silicone oil in the chamber before the air enters a data center or other facility housing computer systems

2. Detailed Description

In accordance with the preferred embodiments of the present invention, silicones are used to prepare chemical filters and chemical baths for removing sulfur contaminants. Silicones have been shown by the inventors to have a high absorption of sulfur-bearing gases such as elemental sulfur, hydrogen sulfide, and other sulfur components in fluids (e.g., air, natural gas, refinery gas, and other gases; as well as water, natural gas liquids (NGLs), diesel fuel, gasoline, and other liquids) while letting the other constituents in the fluids pass.

Important advantages of the present invention in the context of an exemplary application (i.e., air purification for a data center or other facility housing computer systems) include the following: (1) allows removal of sulfur-bearing gases such as elemental sulfur or hydrogen sulfide from air entering the data center; (2) a filter or bath prepared from silicones is advantageous due to the higher absorption of sulfur-bearing gases compared to polymers which contain a sulfur chelating molecule (i.e., once such a polymer chelates, it can no longer absorb sulfur-bearing gases); (3) reduces corrosion failures in the data center; and (4) reduces warranty cost of hardware in the data center. One skilled in the art will appreciate that these and other advantages may extend to other applications of the present invention.

Generally, the present invention may be utilized in the context of any application that involves removing sulfur contaminants in any type of fluid (i.e., liquids and/or gases). For example, the present invention may be used in the context of removing sulfur-bearing gases in air, natural gas, refinery gas and other gases, as well as in water, natural gas liquids (NGLs), diesel fuel, gasoline, and other liquids.

Filtering data center incoming air with a membrane containing specific functional groups can be an effective means to selectively remove unwanted gases from a gas stream. As utilized herein, including the claims, the term "membrane" refers to a thin sheet of polymeric material that is permeable to a fluid (i.e., a liquid and/or gas) from which one or more sulfur contaminants is/are to be removed. The rate of flow of a fluid through the polymeric material is referred to herein as "flux".

Commonly, the removal of sulfur-bearing gases using membranes is achieved by the incorporation of functional groups such as amines or phosphines. However, the concentration of the functional group is commonly very low (typically, less than 0.1 mole percent) and will saturate quickly, thus limiting the amount of unwanted gas that can be removed. As the functional groups are increased in concentration, the integrity of the membrane suffers greatly. From recent studies, the inventors have found that silicones have a very high absorption of sulfur-bearing gases, much higher than what can be achieved by membranes containing functional groups.

To prepare a gas separation membrane from a silicone the following exemplary synthesis can be used: a polyhydrosiloxane (e.g., polymethylhydrosiloxane) is cross-linked via platinum catalyzed hydrosilation with an olefin (e.g., a vinyl or allyl functional polysiloxane copolymer) or via other methods known to those skilled in the art (e.g., cross-linking via radical cure using a thermal radical initiator). This would allow for the polymethylhydrosiloxane, which is normally a viscous oil, to form an elastomer. The modulus of the elastomer may be increased by controlling the degree of cross-linking. In this example, the elastomer is a non-porous silicone membrane. Silicones have been shown to have very high permeabilities allowing common gases ($O_2$, $N_2$, $CO_2$, etc.) to pass while sulfur-bearing gases absorb, thus being removed. This mechanism is illustrated in FIG. 3, described below.

If a higher flux is desired, the non-porous silicone membrane can be made porous by cross-linking the silicone using emulsion (two phase) chemistry. In this example, the silicone can be cross-linked using the same chemistry as given in the above non-porous silicone membrane example with the addition of a porogen (a pore generating material). The silicone would be cross-linked around the porogen, because the porogen is not soluble in the silicone. Removal of the porogen results in the formation of a pore, thus a torturous pathway within the membrane is created. A mechanism similar to that described above with respect to the non-porous silicone membrane example would be achieved, but with an increased gas flow due to the formation of pores within the membrane.

Figure 3:
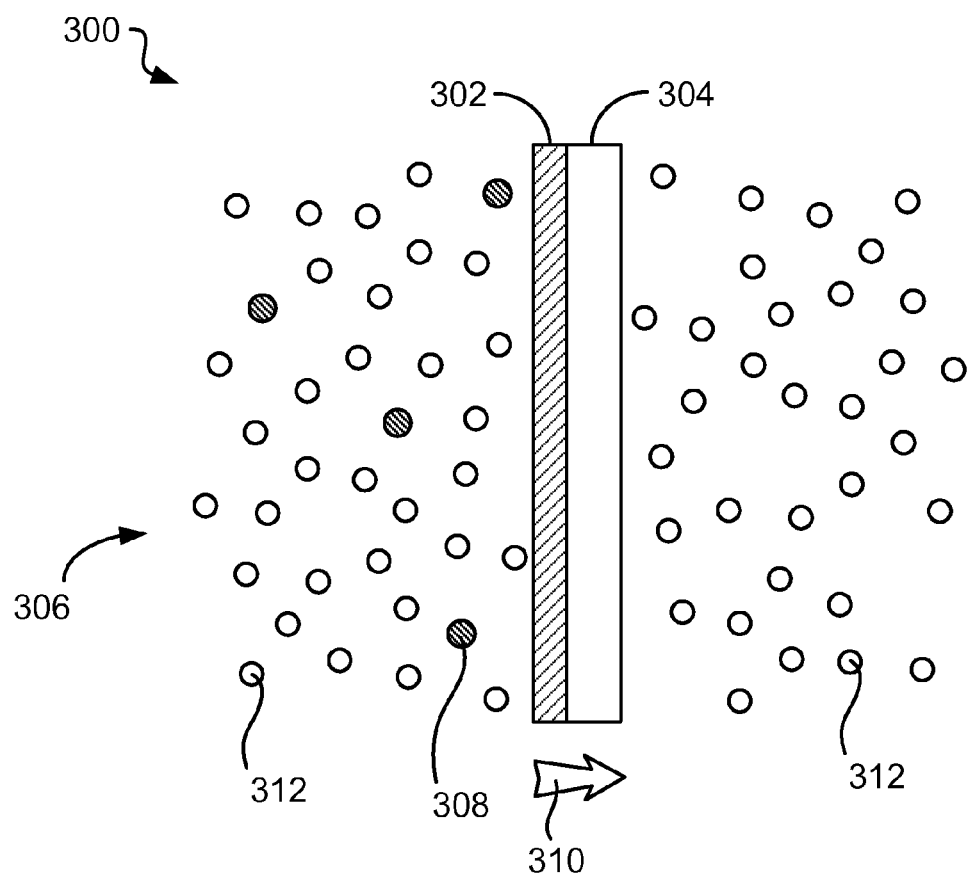
FIG. 3 is a block diagram illustrating an embodiment of a silicone-based chemical filter that employs a cross-linked silicone membrane in accordance with the present invention.

FIG. 3 is a block diagram illustrating an embodiment of a silicone-based chemical filter 300 that employs a cross-linked silicone membrane 302 in accordance with the present invention. In this embodiment, the cross-linked silicone membrane 302, which may be either non-porous or porous, is supported by a porous substrate 304. One skilled in the art will appreciate, however, that the porous substrate 304 may be omitted in lieu of making the cross-linked silicone membrane 302 self-supporting.

A fluid 306 (e.g., air for a data center) having one or more sulfur contaminants 308 (e.g., elemental sulfur, hydrogen sulfide, and other sulfur components) flows in the direction of arrow 310. The sulfur contaminants 308 are absorbed by the cross-linked silicone membrane 302 as the fluid 306 passes through the cross-linked silicone membrane 302 and the porous substrate 304. Hence, the sulfur contaminants 308 are removed from the fluid 306 by absorption into the cross-linked silicone membrane 302. Unlike the sulfur contaminants 308, other constituents 312 (e.g., $O_2$, $N_2$, $CO_2$, etc.) in the fluid 306 pass through the cross-linked silicone membrane 302 and the porous substrate 304.

In accordance with the preferred embodiments of the present invention, the cross-linked silicone membrane 302 is a reaction product of an olefin and a polyhydrosiloxane. The polyhydrosiloxane is preferably cross-linked via platinum catalyzed hydrosilation with the olefin.

As utilized herein, including the claims, the term "polyhydrosiloxane" refers to the following structure.

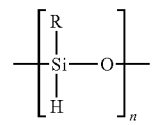

Generally, R is a hydrogen atom, an alkyl group, an alkene group, an aryl group, or an arylene group. Suitable polyhydrosiloxanes include, but are not limited to, a polymethylhydrosiloxane (PMHS), a polyethylhydrosiloxane, a polypropylhydrosiloxane, a polyphenylhydrosiloxane, polydimethylsiloxane methylhydrosiloxane copolymer, and the like, as well as combinations thereof. These exemplary polyhdrosiloxanes are commercially available from sources such as Gelest, Inc., Morrisville, Pa.

As utilized herein, including the claims, the term "olefin" refers to an unsaturated chemical compound containing at least one carbon-to-carbon double bond. Preferably, the olefin is a vinyl or allyl functional polysiloxane copolymer, or a vinyl or allyl functional polysilsesquioxane. A silsesquioxane is a compound having the empirical chemical formula $RSiO_{3/2}$, where R is a hydrogen atom, an alkyl group, an alkene group, an aryl group, or an arylene group. Suitable vinyl or allyl functional polysiloxane copolymers include, but are not limited to, vinyl methylsiloxane, dimethylsiloxane copolymer (trimethyl terminated), vinyl diethylsiloxane dimethylsiloxane copolymer, and the like, as well as combinations thereof. These exemplary olefins are commercially available from sources such as Gelest, Inc., Morrisville, Pa. One skilled in the art will appreciate, however, that the olefin is not limited to a vinyl or allyl functional polysiloxane copolymer or a vinyl or allyl functional polysilsesquioxane. For example, other suitable olefins include, but are not limited to, polysiloxane copolymers and polysilsesquioxanes having a styrene-type functional group (i.e., wherein styrene, polystyrene, or the like is a precursor).

The olefin may also be a multifunctional crosslinking agent (such agents are sometimes termed "hyperfunctional"), such as triallyl isocyanurate (TRIC). Suitable multifunctional crosslinking agents include, but are not limited to, triallyl isocyanurate (TRIC), triallyl citrate, allyl methacrylate, allyl acrylate, divinylbenzene, diethyleneglycol divinyl ether, and the like, as well as combinations thereof.

As mentioned above, the polyhydrosiloxane is preferably cross-linked via platinum catalyzed hydrosilation with the olefin. Suitable catalysts for this reaction include, but are not limited to, platinum divinyltretramethyldisiloxane complex such as platinum(0)-1,3-divinyl-1,1,3,3-tetramethyldisiloxane complex solution. Such catalysts are commercially available from sources such as Gelest, Inc., Morrisville, Pa. Typically, this reaction occurs at room temperature to approximately 70 C.

Although the polyhydrosiloxane is preferably cross-linked with the olefin via platinum catalyzed hydrosilation, in alternative embodiments, cross-linking may be accomplished using other methods known to those skilled in the art. For example, the polyhydrosiloxane may be cross-linked with the olefin via a thermal radical initiator, along with heat. Suitable thermal radical initiators include, but are not limited to, azobisisobutyronitrile (AIBN), benzoyl peroxides (BPDs) (e.g., dibenzoylperoxide and bis(dichlorobenzoyl)peroxide), and the like. Typically, the reaction occurs at approximately 80 C using AIBN, and at approximately 100 C using BPO.

Cross-linking may also be accomplished using a photoinitiator, along with a UV light source. Suitable photoinitiators include, but are not limited to, a sulfonium salt photoinitiator (e.g., triphenylsulfonium triflate), an onium photoinitiator, and the like.

Preferably, the thickness of the cross-linked silicone membrane 302 is within the range of 0.0001 to 1 cm, more preferably, 0.05 to 0.5 cm.

As noted above, the cross-linked silicone membrane 302 is supported by the porous substrate 304. The porous substrate 304 may be, for example, a fibrous material such as conventional air filter media. Suitable conventional air filter media include, but are not limited to, pleated paper, spun fiberglass, cotton, foam, and the like.

Preferably, the cross-linked silicone membrane 302 is affixed to the porous substrate 304. For example, a suitable conventional adhesive may be used to adhere the cross-linked silicone membrane 302 to the porous substrate 304. Alternatively, the cross-linked silicone membrane 302 may be directly formed on the porous substrate 304.

If a higher flux of the fluid 306 through the cross-linked silicone membrane 302 is desired, the cross-linked silicone membrane 302 can be made porous by cross-linking the silicone using emulsion (two phase) chemistry. The silicone in the membrane 302 can be cross-linked using the same cross-linking chemistry as given above (i.e., via platinum-catalyzed hydrosilation, via radical cure using a thermal radical initiator, or via a photoinitiator) with the addition of a porogen (i.e., a pore making material). Because the porogen is not soluble in the silicone, the silicone is cross-linked around the porogen. Removal of the porogen results in the formation of a pore, thus a torturous pathway within the membrane is created. Porogens that can be used to create pores within a silicone membrane 302 include, but are not limited to, ionic surfactants such as quaternary ammonium salts and alkyl amine salts, non-ionic surfactants such as glycerin fatty acid esters and sorbitan fatty acid esters, water and other surfactants known to those skilled in the art.

The size of the pore may be controlled by the concentration of the surfactant or the molecular size of the surfactant.

The porogen may be removed in an acidified alcoholic solution. For example, an ethanol:HCl (e.g., 12:1 by vol.) solution may be used to remove the porogen. Typically, the membrane is placed in this solution for several hours to remove the surfactant.

In embodiments where the cross-linked silicone membrane is used to remove sulfur contaminants from air and the cross-linked membrane is porous, the average pore size is preferably within a range from approximately 100 Å to approximately 500 Å.

Preferably, the concentration of the reaction product in the cross-linked silicone membrane 302 is within the range of 0.01 to 100 wt %. More preferably, the concentration is at the upper end of the range. At the lower end of the range, it may be desirable to incorporate the reaction product as an additive into another polymeric material. For example, to improve the longevity of a conventional polymer membrane incorporating functional groups such as amines or phosphines, the reaction product may be incorporated as an additive into such a conventional polymer membrane. Such a modified conventional polymer membrane would be able to absorb sulfur-bearing gases long after the functional groups saturate.

Figure 4:
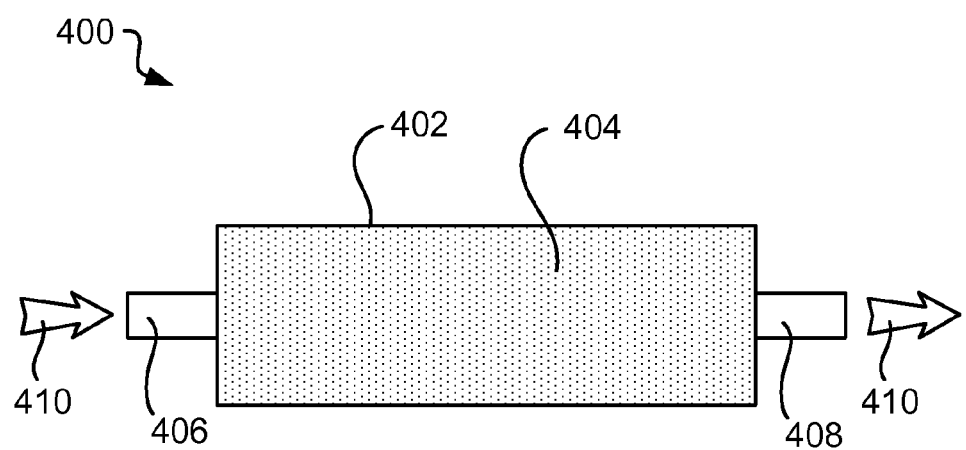
FIG. 4 is a block diagram illustrating another embodiment of a silicone-based chemical filter that employs a packed column filled with a packing material that includes a cross-linked silicone membrane or coating in accordance with the present invention.

FIG. 4 is a block diagram illustrating another embodiment of a silicone-based chemical filter 400 that employs a packed column 402 filled with a packing material 404 that includes a cross-linked silicone membrane or coating in accordance with the present invention. Preferably, the packing material 404 is a conventional random-type packing, such as Raschig rings (not shown) or other small objects coated or modified to include a coating of the cross-linked silicone membrane. Raschig rings are pieces of tube that provide a large surface area within the volume of the packed column 402 for interaction with fluid flowing through the column. Typically, each of the pieces of tube has approximately the same length and diameter. In accordance with the preferred embodiments of the present invention, the cross-linked silicone membrane is coated on the interior and/or exterior (preferably both) of each of the Raschig rings. Alternatively, the packing material 404 may be conventional structured packing modified to include a coating of the cross-linked silicone membrane. In either case, the coating thickness of the cross-linked silicone membrane is preferably within the range of 0.0001 to 1 cm, more preferably, 0.05 to 0.5 cm.

The packed column 402 includes an inlet port 406 and an outlet port 408, each in fluid communication with the interior of the packed column 402. A fluid (e.g., air for a data center) having one or more sulfur contaminants (e.g., elemental sulfur, hydrogen sulfide, and other sulfur components) enters the packed column 402 at the inlet port 406 and exits the packed column 402 at the outlet port 408. The fluid generally flows in the direction shown by arrows 410 (although within the packed column 402, the Raschig rings randomly redirect the direction of flow). The sulfur contaminants are absorbed by the cross-linked silicone membrane as the fluid passes through the packed column 402. Hence, the sulfur contaminants are removed from the fluid by absorption into the cross-linked silicone membrane coated on the Raschig rings. Unlike the sulfur contaminants, other constituents (e.g., $O_2$, $N_2$, $CO_2$, etc.) in the fluid pass through the packed column 402 without being absorbed by the cross-linked silicone membrane coated on the Raschig rings.

One skilled in the art will appreciate that the particular configuration of the packed column 402 illustrated in FIG. 4 is exemplary and for purposes of illustrating an embodiment of the present invention and, hence, the particular configuration illustrated therein is not limiting.

Additionally, in some applications, gas streams may be purified by passing through a chemical bath. Commonly, the bath contains a polymer with a pendent functional group that is specific to an unwanted gas that is to be removed. However, this would be plagued by the low concentration of the functional group leading to rapid saturation. A more facile method for sulfur removal in accordance the present invention is a bath containing essentially only silicone oil (e.g., polydimethylsiloxane). Such a bath is ideal because the silicone oil requires no solvents, has a high permeability and allows more sulfur to be removed than possible with functional group polymer approaches.

As used herein, including the claims, the term "silicone oil" refers to a polymerized siloxane. A siloxane chain is characterized by alternating silicon-oxygen atoms. Other species attach to the tetravalent silicon atoms in the siloxane chain, not the divalent oxygen atoms. A typical example (and the most common silicone oil) is polydimethylsiloxane (PDMS), where two methyl groups attach to each silicon atom to form the following structure.

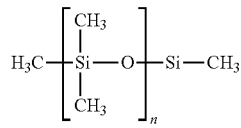

Figure 5:
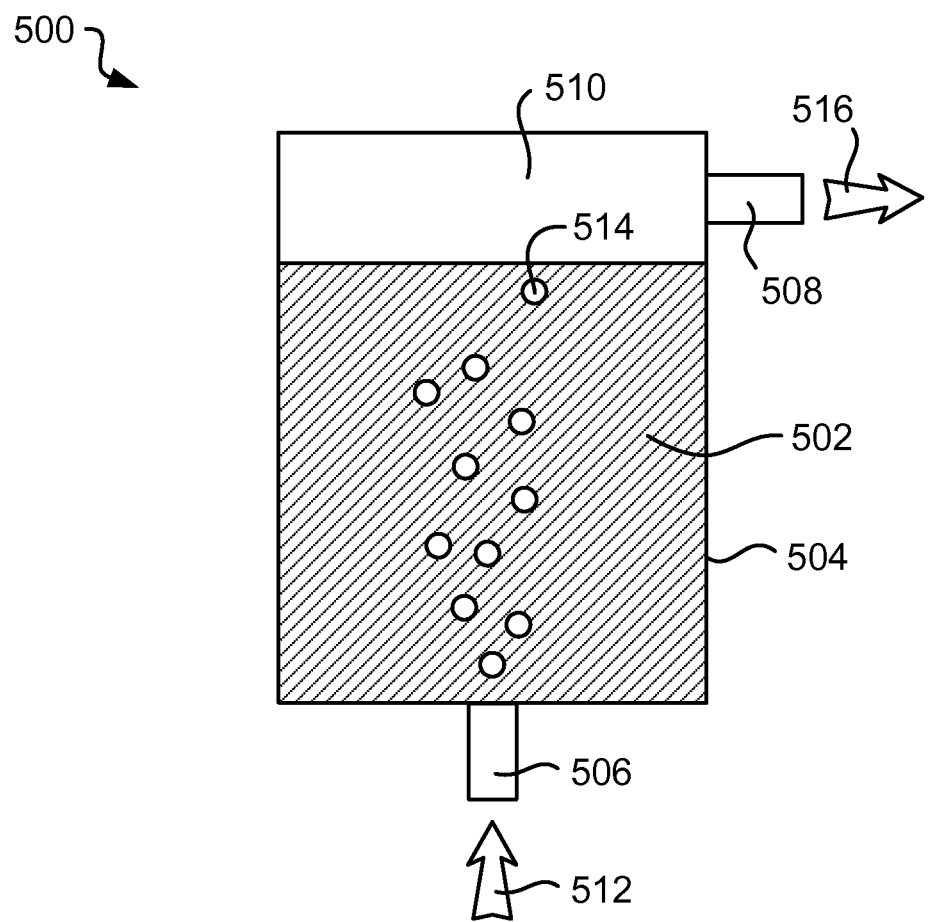
FIG. 5 is a block diagram illustrating an embodiment of a silicone-based chemical bath that employs a silicone oil in accordance with the present invention.

FIG. 5 is a block diagram illustrating an embodiment of a silicone-based chemical bath 500 that employs a silicone oil 502 in accordance with the present invention. The silicone-based chemical bath 500 includes a housing 504 having an inlet port 506, an outlet port 508, and a chamber 510 in fluid communication with the inlet port 506 and the outlet port 506. The chamber 510 contains the silicone oil 502. Suitable silicone oils include polydimethylsiloxane (PDMS), poly(dimethylsiloxane-co-methylphenylsiloxane), polyphenyl-methylsiloxane, and the like, as well as combinations thereof.

A gaseous fluid (e.g., air for a data center) having one or more sulfur contaminants (e.g., elemental sulfur, hydrogen sulfide, and other sulfur components) enters the chamber 510 through the inlet port 506 and exits the chamber 510 through the outlet port 508. The gaseous fluid flows in the direction shown by arrow 512 through the inlet port 506, forms bubbles 514 and rises in the silicone oil 502, and then flows in the direction shown by arrow 516 through the outlet port 508. The sulfur contaminants are absorbed by the silicone oil 502 as the gaseous fluid bubbles through the silicone oil 502. Hence, the sulfur contaminants are removed from the gaseous fluid by absorption into the silicone oil. Unlike the sulfur contaminants, other constituents (e.g., $O_2$, $N_2$, $CO_2$, etc.) in the gaseous fluid pass through the chamber 510 without being absorbed by the silicone oil 502. Preferably, the temperature of the silicone oil 502 in the chamber 510 is approximately 25 C.

One skilled in the art will appreciate that the particular configuration of the silicone-based chemical bath 500 illustrated in FIG. 5 is exemplary and for purposes of illustrating an embodiment of the present invention and, hence, the particular configuration illustrated therein is not limiting.

Figure 6:
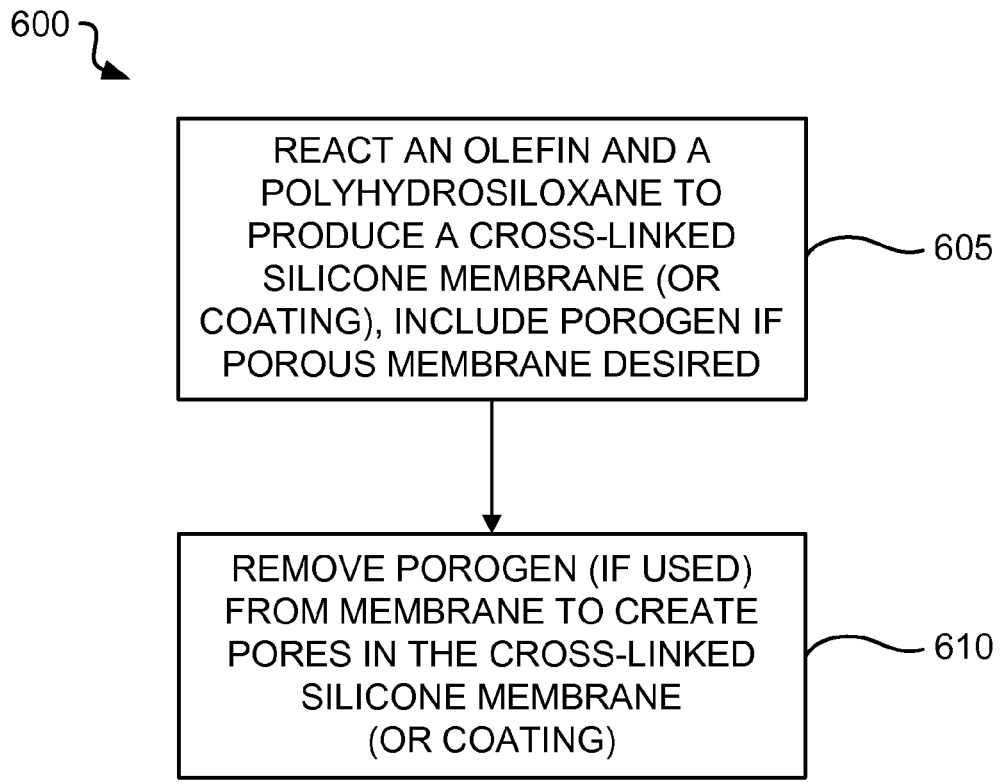
FIG. 6 is a flow diagram illustrating a method of making a silicone-based chemical filter that employs a cross-linked silicone membrane (or coating) in accordance with the present invention.

FIG. 6 is a flow diagram illustrating a method 600 of making a silicone-based chemical filter that employs a cross-linked silicone membrane (or coating) in accordance with the present invention. In the method 600, the steps discussed below (steps 605-610) are performed. These steps are set forth in their preferred order. It must be understood, however, that the various steps may occur simultaneously or at other times relative to one another. Moreover, those skilled in the art will appreciate that one or more steps may be omitted.

Method 600 begins by preparing a cross-linked silicone membrane or coating by reacting an olefin and a polyhydrosiloxane (step 605). For example, these reagents (and, optionally, along with a porogen as described below) in the form of a polymer solution may be applied onto a substrate in step 605. The substrate may be permanent (e.g., the porous substrate 304 (described above with respect to FIG. 3), the packing material 404 (described above with reference to FIG. 4), and the like) or may be temporary as described below. Preferably, the polymer solution is applied in an at least partially uncured state by dipping, spray coating, spin-coating, casting, brushing, rolling, syringe, or any suitable deposition process. Then, the polymer solution is cured to thereby produce the cross-linked silicone membrane or coating.

In the embodiment illustrated in FIG. 6, a porous cross-linked silicone membrane or coating is desired (i.e., the cross-linked membrane or coating will be used for a particular application that calls for a porous membrane). When a porous membrane or coating is desired, a porogen is added to the reagents in step 605. One skilled in the art will appreciate, however, that a porogen need not be used if a porous membrane or membrane is not desired for a particular application.

Next, the porogen (if used) is removed to create a porous cross-linked silicone membrane or coating (step 610). For example, step 610 may involve soaking the cross-linked silicone membrane or membrane prepared in step 605 in an acidified alcohol solution for a number of hours.

Alternatively, the cross-linked silicone membrane or coating may be formed on a temporary substrate and at least partially cured, removed from the temporary substrate, and then applied to a porous substrate. For example, the cross-linked silicone membrane or coating may be adhered to the porous substrate using a suitable conventional adhesive.

Figure 7:
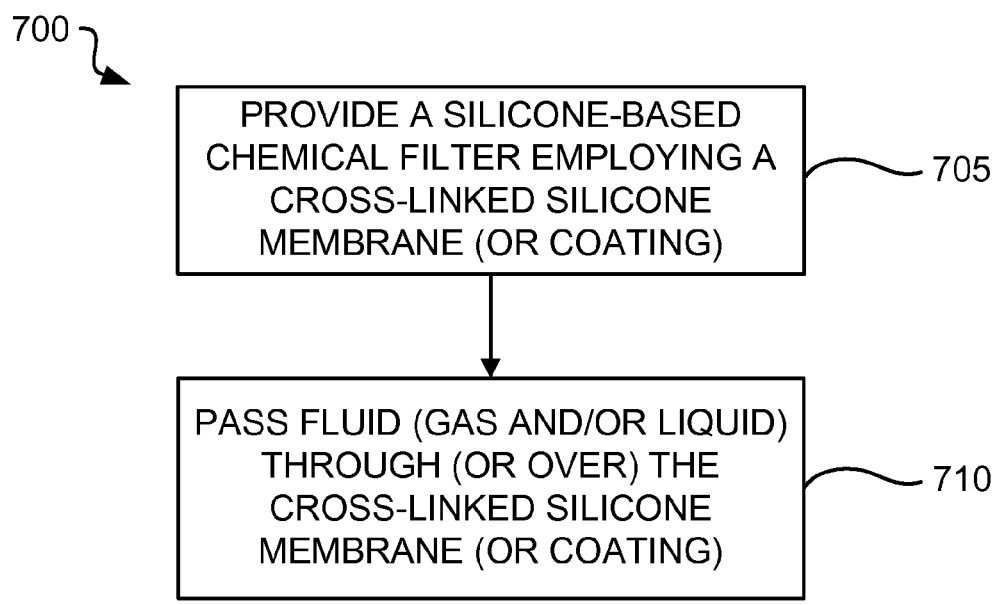
FIG. 7 is a flow diagram illustrating a method of using a silicone-based chemical filter that employs a cross-linked silicone membrane (or coating) in accordance with the present invention.

FIG. 7 is a flow diagram illustrating a method 700 of using a silicone-based chemical filter that employs a cross-linked silicone membrane (or coating) in accordance with the present invention. In the method 700, the steps discussed below (steps 705-710) are performed. These steps are set forth in their preferred order. It must be understood, however, that the various steps may occur simultaneously or at other times relative to one another. Moreover, those skilled in the art will appreciate that one or more steps may be omitted.

Method 700 begins by providing a silicone-based chemical filter that employs a cross-linked silicone membrane or coating (step 705). Such a filter may, for example, include the silicone-based chemical filter 300 (shown in FIG. 3) or the silicone-based chemical filter 400 (shown in FIG. 4). The method 700 continues with a fluid (e.g., air, natural gas, and other gases; as well as water, natural gas liquids (NGLs), diesel fuel, gasoline, and other liquids) being passed through (or over) the cross-linked silicone membrane (or coating) of the silicone-based chemical filter to remove one or more sulfur contaminates from the fluid (step 710).

Figure 8:
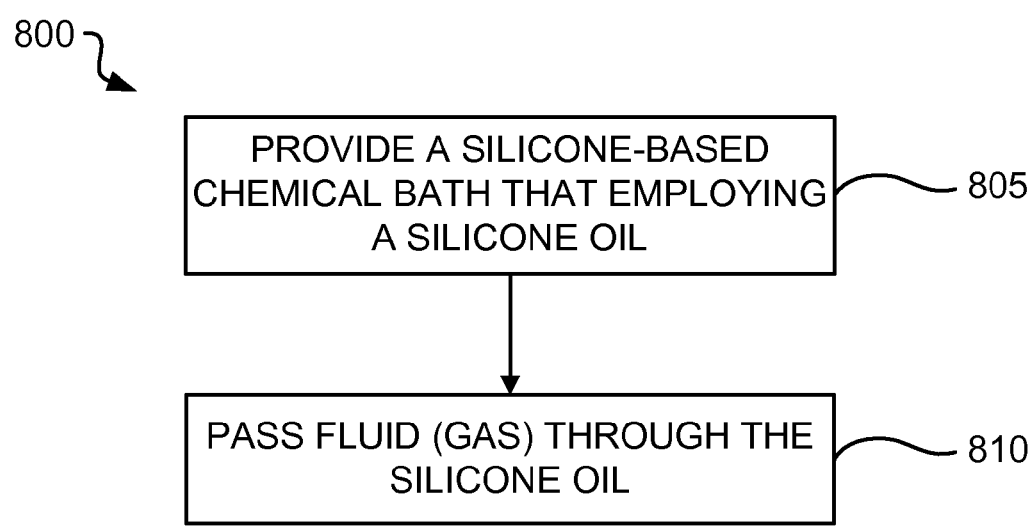
FIG. 8 is a flow diagram illustrating a method of using a silicone-based chemical bath that employs a silicone oil in accordance with the present invention.

FIG. 8 is a flow diagram illustrating a method of using a silicone-based chemical bath that employs a silicone oil in accordance with the present invention. In the method 800, the steps discussed below (steps 805-810) are performed. These steps are set forth in their preferred order. It must be understood, however, that the various steps may occur simultaneously or at other times relative to one another. Moreover, those skilled in the art will appreciate that one or more steps may be omitted.

Method 800 begins by providing a silicone-based chemical bath that employs a silicone oil (step 805). Such a bath may, for example, include the silicone-based chemical bath 500 (shown in FIG. 5). The method 800 continues with a fluid (e.g., air, natural gas, and other gases) being passed through the silicone oil of the silicone-based chemical bath to remove one or more sulfur contaminates from the fluid (step 810).

As noted above, a filter or bath prepared from silicones according to the present invention is advantageous due to the higher absorption of sulfur-bearing gases compared to conventional polymer membranes which contain a sulfur chelating molecule. Nonetheless, the sulfur absorption capability of a filter or bath prepared from silicones according to the present invention will diminish with time. Hence, it may be desirable to regenerate the sulfur absorption capability of the cross-linked silicone membrane (or coating) or silicone oil. Typically, regeneration may be accomplished though the application of heat.

One skilled in the art will appreciate that many variations are possible within the scope of the present invention. Thus, while the present invention has been particularly shown and described with reference to the preferred embodiments thereof, it will be understood by those skilled in the art that these and other changes in form and detail may be made therein without departing from the spirit and scope of the present invention.

What is claimed is:

1. A method for removing elemental sulfur (Ss) from air, comprising the step of:
   providing a silicone-based chemical bath comprising:
      a housing having an inlet port, an outlet port, and a chamber in fluid communication with the inlet port and the outlet port;
      a silicone oil contained in the chamber;
   passing air containing elemental sulfur ($S_8$) through the silicone-based chemical bath, wherein the step of passing air containing elemental sulfur through the silicone-based chemical bath includes a step of bubbling the air containing elemental sulfur through the silicone oil, and wherein the elemental sulfur contained in the air is absorbed by the silicone oil as the air containing elemental sulfur bubbles through the silicone oil.

2. A method for removing elemental sulfur (Ss) from air entering a data center, comprising the step of:
   providing a silicone-based chemical bath comprising:
      a housing having an inlet port, an outlet port in fluid communication with a data center, and a chamber in fluid communication with the inlet port and the outlet port;
      a silicone oil contained in the chamber;
   passing air containing elemental sulfur ($S_8$) through the silicone-based chemical bath, wherein the step of passing air containing elemental sulfur through the silicone-based chemical bath includes a step of bubbling the air containing elemental sulfur through the silicone oil, and wherein the elemental sulfur contained in the air is absorbed by the silicone oil as the air containing elemental sulfur bubbles through the silicone oil so that the elemental sulfur contained in the air is removed before the air enters the data center.

* * * * *